Jan. 24, 1967     J. F. COPLIN ETAL     3,299,961
HELICOPTER ROTOR
Filed May 5, 1965     2 Sheets-Sheet 1
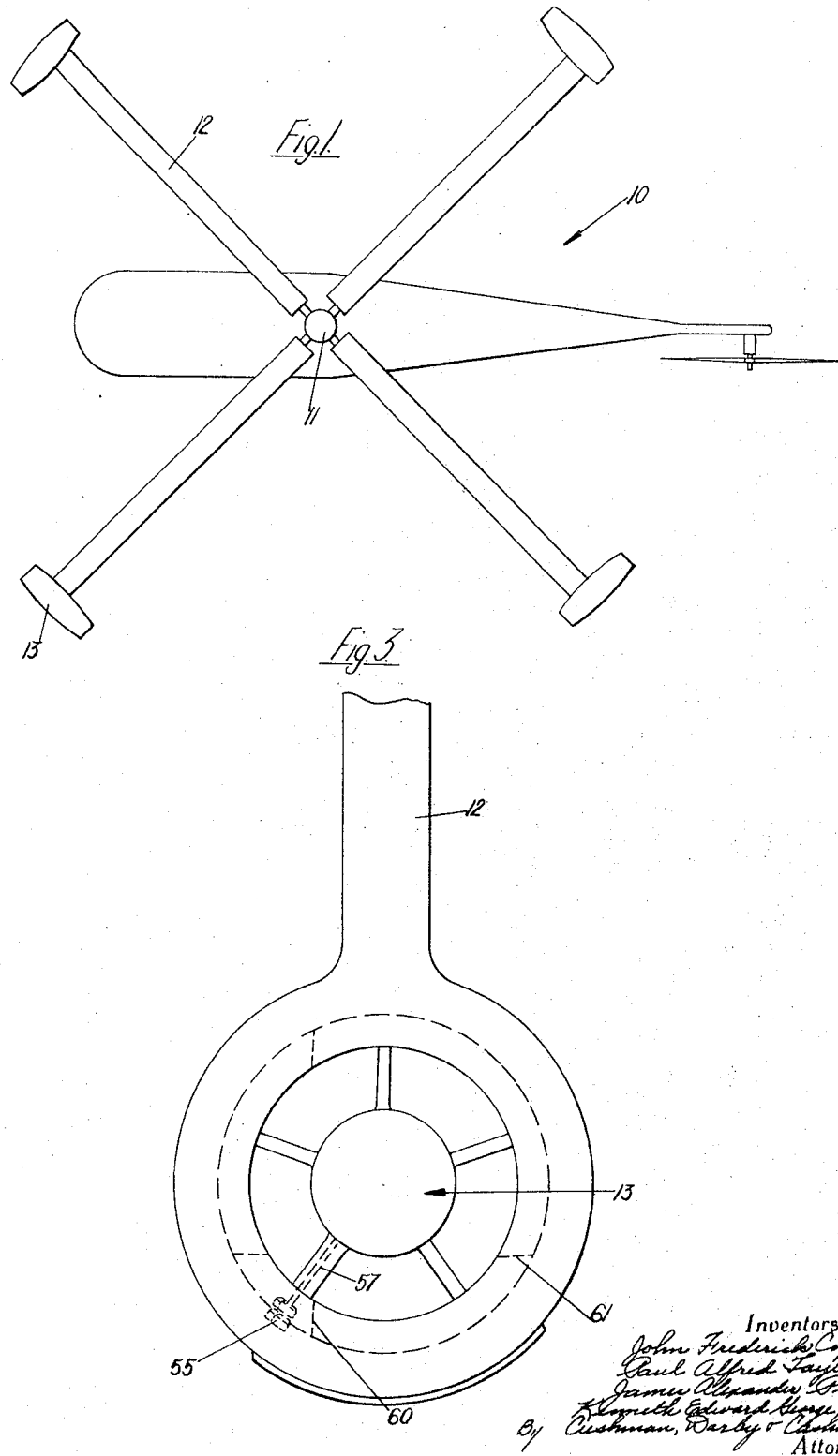

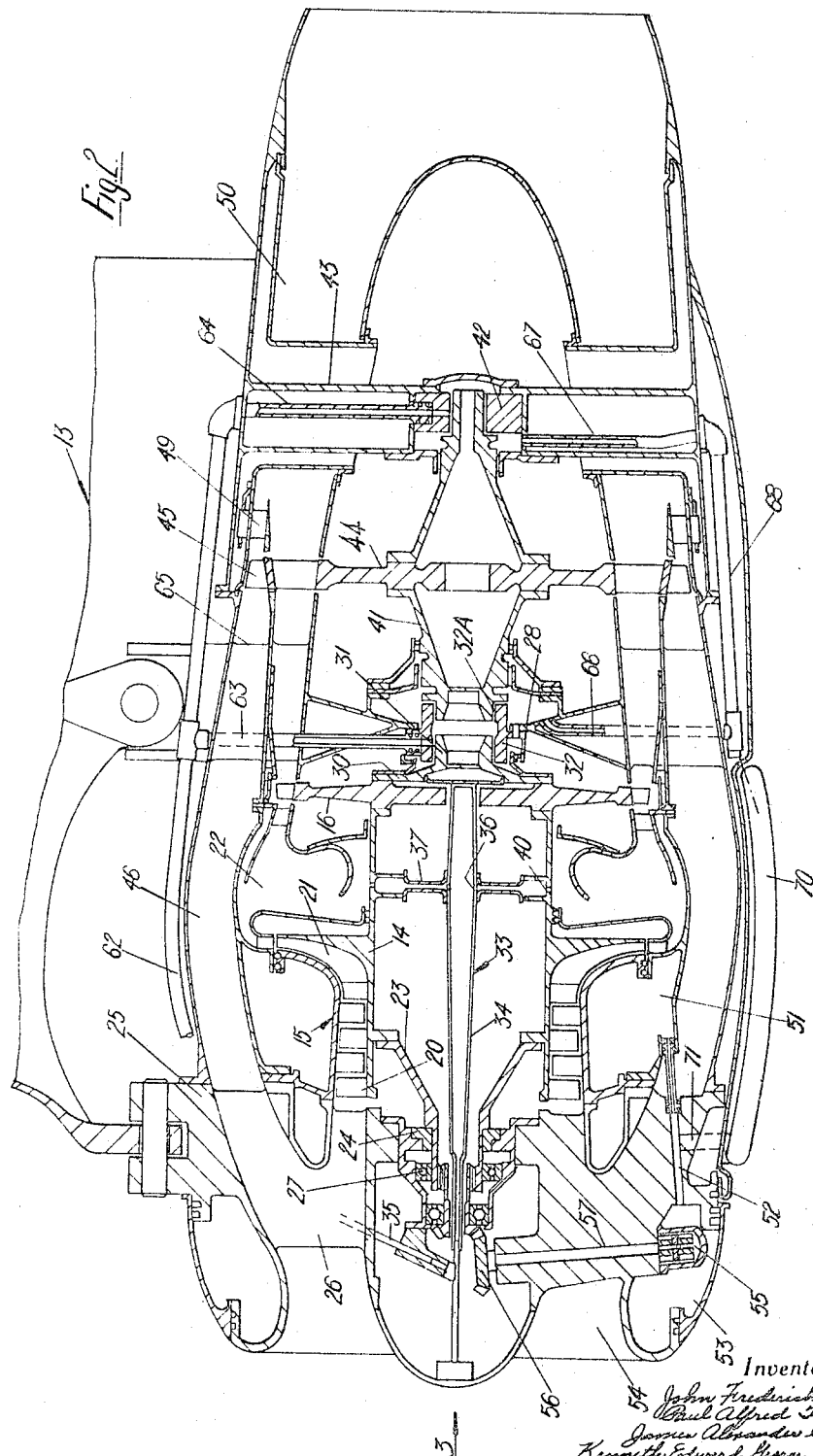

United States Patent Office 3,299,961
Patented Jan. 24, 1967

3,299,961
HELICOPTER ROTOR
John Frederick Coplin, Paul Alfred Taylor, James Alexander Petrie, and Kenneth Edward George Bracey, all of Derby, England, assignors to Rolls-Royce Limited, Derby, England, a company of Great Britain
Filed May 5, 1965, Ser. No. 453,285
Claims priority, application Great Britain, June 8, 1964, 23,736/64
6 Claims. (Cl. 170—135.4)

This invention concerns helicopter rotors.

According to the present invention, there is provided a helicopter rotor having a plurality of angularly spaced apart blades and a plurality of gas turbine engines, one on the tip of each blade, each gas turbine engine having a first shafting, a compressor and a turbine mounted thereon, a second shafting axially spaced from the first shafting, and a free turbine mounted thereon and driven by the gases passing through the engine, the said gases driving the first and second shaftings in opposite angular senses.

The free turbine may drive a fan and the fan may be disposed in a duct which by-passes the compressor and the first-mentioned turbine.

The first and second shaftings may have adjacent ends which are mounted in a common plain bearing, or in two plain bearings mounted in a common housing. Moreover, at least one of said shaftings may have its other end also mounted in a plain bearing.

A lubricant reservoir may be disposed within the engine and lubricant supply ducting may be provided for supplying the or each plain bearing with lubricant from the lubricant reservoir, the lubricant reservoir communicating with lubricant return ducting which receives lubricant which has passed through said plain bearing or bearings, a pump being provided for circulating lubricant from the lubricant reservoir and through the supply and return ductings back to the lubricant reservoir. The return ducting may incorporate a lubricant cooler, while the said pump may be driven by the first shafting.

The first shafting may incorporate an outer shaft on which the compressor and the first-mentioned turbine are mounted and an inner duct the diameter of at least a portion of which increases in a downstream direction, means for supplying fuel to the interior of the inner duct at the upstream end of said portion, a conduit communicating with the said interior at the downstream end of said portion and with combustion equipment of the engine.

The invention also comprises a helicopter provided with a helicopter rotor as set forth above.

The invention is illustrated, merely by way of example, in the accompanying drawings, in which:

FIGURE 1 is a plan view of a helicopter according to the present invention,

FIGURE 2 is a section through one of the gas turbine engines used in the helicopter of FIGURE 1, and FIGURE 3 is a diagrammatic view looking in the direction of the arrow 3 of FIGURE 2.

Referring to the drawings, a helicopter 10 has a rotor mast 11 which is provided with four angularly spaced apart blades 12 each of which is provided at its tip with a gas turbine jet engine 13.

Each of the gas turbine engines 13 (see FIGURE 2) has a shaft 14 on which is mounted a compressor 15 and a one stage turbine 16. The compressor 15 has two consecutive axial stages 20 followed by a centrifugal stage 21. The compressed air leaving the downstream end of the compressor 15 passes into combustion equipment 22 the combustion gases from which pass through the turbine 16.

The upstream end of the shaft 14 is bolted to an end sleeve 23, the end sleeve 23 being rotatably mounted within a plain bearing 24 and a ball thrust bearing 27 adjacent thereto. The bearings 24 and 27 are supported from a casing 25 by means of a plurality of angularly spaced apart intake struts 26.

The downstream end of the shaft 14 is secured to a dished member 30 which has at its downstream end a cylindrical portion 31 which is mounted within a plain bearing 32, the plain bearing 32 being mounted in a bearing housing 28.

Mounted within the shaft 14 is a duct 33 one portion 34 of which has a diameter which increases in a downstream direction. The interior of the duct 33 is supplied, at the upstream end of the portion 34, with fuel from a fuel pipe 35. The downstream end of the portion 34 communicates, by way of drillings 36, with the interior of an annular member 37 which supports the duct 33 from the shaft 14, the annular member 37 having radial passages for the flow of fuel therethrough. The shaft 14 is provided with drillings 40 which communicate with the radial passages in the annular member 37 and with the combustion equipment 22 so as to supply the fuel to the latter.

A shaft 41, which is axially spaced from the shaft 14, has its upstream end mounted in a plain bearing 32A supported by the bearing housing 28. The downstream end of the shaft 41 is mounted in a plain bearing 42 which is carried by a plurality of angularly spaced apart struts 43 which extend from the casing 25.

The shaft 41 carries a free turbine 44 which is driven by the gases passing through the engine, the said gases driving the turbines 16, 44 in opposite angular senses.

The free turbine 44 has rotor blades which are provided at their tips with rotor blades of a fan 45. The fan 45 is an aft fan which is mounted in a duct 46, the duct 46 by-passing the compressor 15, the combustion equipment 22 and the turbine 16.

The air which has passed through the fan 45 passes through vanes 49 to mix with the turbine exhaust gases in an exhaust duct 50.

A lubricant reservoir 51 is disposed within the engine and communicates via a passage 52 with an annular chamber 53 disposed adjacent the leading edge of the engine air intake 54. Mounted in the chamber 53 is a lubricating oil supply pump 55 which is driven from the shaft 14 by way of gearing 56 and a shaft 57. As will be seen from FIGURE 3, the pump 55 is located so that it is disposed adjacent the level 60 which is adopted by the lubricant in the chamber 53 when the engine is stationary. The pump 55 may therefore pump lubricant both when the level is as shown at 60 and also when the level is at a position 61 which it adopts when the engine 13 is rotating.

The chamber 53 communicates (by means not shown) with a supply duct 62 which itself communicates with supply ducts 63, 64. The supply duct 64 extends through one of the struts 43 so as to supply lubricant to the plain bearing 42. The supply duct 63 extends through one of a plurality of angularly spaced apart struts 65 so as to supply lubricant to the plain bearings 32, 32A, the struts 65 being supported by the casing 25.

The lubricant which has passed through the plain bearings 32, 32A, 42, flows through return ducts 66, 67 respectively. The return ducts 66, 67 communicate with a return duct 68 from which the lubricant passes through a lubricant cooler 70 and a passage 71 back to the passage 52 and the reservoir 51.

The shafts 14, 41 may in operation rotate at very considerable relative speed e.g. of the order of 80,000 r.p.m. The construction shown in the drawings enables this high relative speed to be satisfactorily coped with, without the use of inter-bearings which would be difficult to keep adequately lubricated.

The use moreover of the contra-rotating shafts 14, 41, largely offsets the gyro couples produced by the engine.

We claim:

1. A helicopter rotor having a plurality of angularly spaced apart blades and a plurality of gas turbine engines, one on the tip of each blade, each gas turbine engine having a first shafting, a compressor and a turbine mounted thereon, a second shafting axially spaced from the first shafting, and a free turbine mounted thereon and driven by the gases passing through the engine, the said gases driving the first and second shaftings in opposite angular senses.

2. A helicopter rotor as claimed in claim 1 including a duct by-passing said compressor and said first-mentioned turbine, and a fan driven by said free turbine and disposed within said duct.

3. A helicopter rotor having a plurality of angularly spaced apart blades and a plurality of gas turbine engines, one on the tip of each blade, each gas turbine engine having a first shafting, a compressor and a turbine mounted thereon, a second shafting, a free turbine mounted thereon and driven by the gases passing through the engine, the said gases driving the first and second shaftings in opposite angular senses, a bearing housing, and at least one plain bearing in which adjacent ends of said first and second shaftings are mounted.

4. A helicopter rotor as claimed in claim 3 wherein said bearing housing is a common housing, two plain bearings mounted therein, adjacent ends of said first and second shaftings being mounted in said bearings and a further plain bearing in which the opposite end of one of said shaftings is mounted.

5. A helicopter rotor as claimed in claim 3 wherein a lubricant reservoir is disposed within the engine, lubricant supply ducting for supplying said at least one plain bearing with lubricant from the lubricant reservoir, lubricant return ducting which receives lubricant which has passed through said at least one plain bearing, to return it to said reservoir, a lubricant cooler incorporated in said return ducting, and a pump driven by said first shafting for circulating lubricant from the lubricant reservoir and through the supply and return ductings back to the lubricant reservoir.

6. A helicopter rotor having a plurality of angularly spaced apart blades and a plurality of gas turbine engines, one on the tip of each blade, each gas turbine engine having a first shafting incorporating an outer shaft and an inner duct, a compressor and a turbine mounted on said outer shaft, a second shafting, a second turbine mounted thereon and driven by the gases passing through the engine, the said gases driving the first and second shaftings in opposite angular senses, combustion equipment, a portion of said inner duct increasing in diameter in a downstream direction, means for supplying fuel to the interior of the inner duct at the upstream end of said portion, and a conduit communicating with the said interior at the downstream end of said portion and with said combustion equipment of the engine.

References Cited by the Examiner

FOREIGN PATENTS 800,222 8/1958 Great Britain.
938,459 10/1963 Great Britain.

MARTIN P. SCHWADRON, Primary Examiner.

EVERETTE A. POWELL, Jr., Assistant Examiner.